United States Patent Office 3,272,818
Patented Sept. 13, 1966

3,272,818
3-PHENYL-4-PIPERAZINYLCINNOLINES
Harman S. Lowrie, Glenview, Ill., assignor to G. D. Searle & Co., Chicago, Ill., a corporation of Delaware
No Drawing. Filed July 13, 1964, Ser. No. 382,341
6 Claims. (Cl. 260—268)

The present invention relates to a group of 3-phenylcinnolines which have a piperazine substituent at the 4-position of the cinnoline nucleus. More particularly, it relates to a group of compounds which can be represented by the following general formula

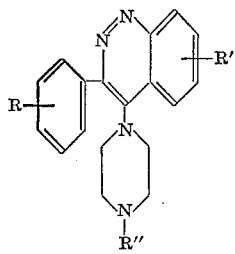

wherein R and R' are selected from the group consisting of hydrogen, halogen, lower alkyl and lower alkoxy; and R" is selected from the group consisting of hydrogen, lower alkyl, hydroxyethyl, phenyl, benzyl, lower alkanoyl, and (lower alkoxy) carbonyl. The halogen radicals referred to above include fluorine, chlorine, bromine, and iodine. The lower alkyl radicals referred to above contain up to 6 carbon atoms and can be represented by methyl, ethyl, propyl, butyl, hexyl, and the like. The lower alkanoyl radicals referred to above likewise contain up to 6 carbon atoms and can be exemplified by acetyl and propionyl. The lower alkoxy radicals referred to above contain up to 6 carbon atoms and can be exemplified by methoxy and ethoxy.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids.

The compounds of the present invention are conveniently prepared by the reaction of the appropriate 4-chloro-3-phenylcinnoline with a piperazine or a N-substituted piperazine. Actually, where piperazine itself is the basic starting material, the product is a 3-phenyl-4-piperazinylcinnoline of the formula

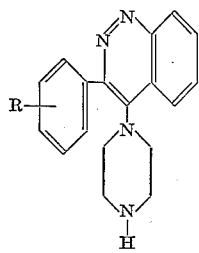

wherein R is defined as above and this can be reacted with the appropriate halide of the formula R"-halogen to give the disubstituted piperazine. Thus, it should be obvious that halides such as methyl bromide and benzyl chloride can be used or acyl-type halide such as acetyl chloride and ethyl chlorocarbonate.

The 4-chlorocinnoline referred to above can be prepared by two different procedures both of which involve a use of phosphorus oxychloride in the final step. Thus, treatment of a 3-phenyl-4-hydroxycinnoline, or either 3-phenylcinnoline N-oxide with phosphorus oxychloride gives the 4-halide. The N-oxides are obtained from 3-phenylcinnoline-4-carboxylic acids which are decarboxylated and then oxidized with reagents such as hydrogen peroxide or 3-chloroperbenzoic acid. Details of the above reactions are described in my copending application.

The compounds of this invention possess valuable pharmacological properties. In particular, they possess activity as hypotensive agents. In addition, they possess anti-biotic activity against a variety of organisms. Thus, they inhibit the growth of bacteria such as *Diplococcus pneumoniae*, protozoa such as *Tetrahymena gelleii*, and algae such as *Chlorella vulgaris*, and they inhibit germination of seeds of Trifolium. In addition, the present compounds show activity as dieuretic agents.

The following examples are presented to further illustrate the present invention; they should not be construed as limiting it in spirit or in scope. In these examples, quantities are in parts by weight unless parts by volume are specified and temperatures in degrees centigrade (° C.). The relationship between parts by weight and parts by volume is the same as that between grams and milliliters.

*Example 1*

A mixture of 4 parts of 4-chloro-3-phenylcinnoline, 1 part of copper powder, and 20 parts by volume of 1-methylpiperazine is refluxed for 1.5 hours. The resultant mixture is cooled, diluted with ethyl ether, and filtered, and the filtrate is washed with dilute potassium hydroxide solution. The ether solution is then extracted with dilute hydrochloric acid and the acid extract is made alkaline with dilute potassium hydroxide. The alkaline solution is then extracted with ether and the ether solution is dried first with saturated sodium chloride solution and then with anhyrous potassium carbonate. The solvent is evaporated from the ether solution to leave a residual brown glass which is crystallized from hexane to give yellow prisms of 4-(4-methyl-1-piperazinyl)-3-phenylcinnoline melting at about 128–129° C. This compound has the following formula

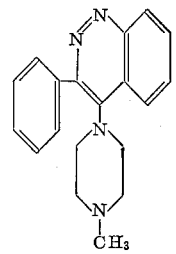

*Example 2*

A mixture of 5.5 parts of 4-chloro-3-(4-chlorophenyl)cinnoline and 4 parts of 1-methylpiperazine in 10 parts of dimethyl sulfoxide is heated on a steam bath for 16 hours. The resulting solution is cooled and diluted with ether and the ether solution is washed with dilute potassium hydroxide and then extracted with dilute hydrochloric acid. The acid extract is made alkaline with potassium hydroxide and then extracted with ether. The ether solution is dried first with saturated sodium chloride solution and then with anhydrous potassium carbonate, and the solvent is evaporated. The residue is recrystallized from a mixture of ether and hexane to give 3-(4-chlorophenyl)-4-(4-methyl-1-piperazinyl)cinnoline melting at about 151–153° C.

If 4-chloro-3-(4-tolyl)cinnoline is subsituted for the 4-chloro-3-(4-chlorophenyl)cinnoline and the above procedure is repeated, the product obtained is 4-(4-methyl-1-piperazinyl)-3-(4-tolyl)cinnoline.

Example 3

5.5 parts of 4-chloro-3-(4-methoxyphenyl)cinnoline is substituted for the 5.5 parts of 4-chloro-3-(4-chlorophenyl)cinnoline and the procedure of Example 2 is repeated. However, in this case, methylene chloride is used in place of ether in the final extraction. The solvent is then evaporated from the methylene chloride solution and the residual material is crystallized from ether at 0° C. to give 3 - (4-methoxyphenyl)-4-(4-methyl-1-piperazinyl)cinnoline melting at about 156–157° C.

Example 4

A mixture of 2.4 parts of 4-chloro-3-phenylcinnoline and 2.6 parts of 1-(2-hydroxyethyl)piperazine in 10 parts of dimethyl sulfoxide is heated on a steam bath for 16 hours. The resultant solution is cooled, diluted with ethyl ether, and then washed with dilute potassium hydroxide solution. The ether solution is then extracted with dilute hydrochloric acid and the acid extract is made alkaline with dilute potassium hyroxide. The resultant alkaline solution is extracted with ether, the ether solution is dried, and the solvent is evaporated under reduced pressure. The residual oil is crystallized from benzene to give 4-[4-(2-hydroxyethyl)-1-piperazinyl]-3-phenylcinnoline as brown needles melting at about 170–173° C. This compound has the following formula

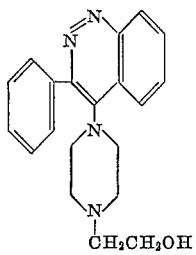

Example 5

A mixture of 31 parts of 4-chloro-3-phenylcinnoline and 34 parts of piperazine in 100 parts of dimethyl sulfoxide is heated on a steam bath for 17 hours. The cooled reaction mixture is diluted with methylene chloride and the resultant solution is washed with dilute potassium hydroxide and then dried, first with saturated sodium chloride solution and then with anhydrous potassium carbonate. The solvent is evaporated under reduced pressure and the resultant residue is crystallized from benzene to give 3-phenyl-4-(1-piperazinyl)cinnoline as yellow clusters melting at about 171–173° C.

Example 6

To a solution of 4.4 parts of 3-phenyl-4-(1-piperazinyl)cinnoline in 40 parts of methylene chloride is added 2 parts of acetic anhydride. The resultant solution is allowed to stand at room temperature for 17 hours. The solution is then washed with dilute potassium hydroxide and dried and the solvent is evaporated under reduced pressure. The residual material is crystallized from a mixture of acetone and hexane to give 4-(4-acetyl-1-piperazinyl)-3-phenylcinnoline as yellow clusters melting at about 209–210° C.

If propionic anhydride is substituted for the acetic anhydride and the procedure in the preceding paragraph is repeated, there is obtained 3-phenyl-4-(4-propionyl-1-piperazinyl)cinnoline.

Example 7

A mixture of 18.7 parts of 4-chloro-3-phenylcinnoline, 1 part of copper powder, and 60 parts of 1-carbethoxypiperazine is refluxed for 1 hour. The resultant mixture is cooled and then diluted with methylene chloride and filtered. The filtrate is washed first with dilute potassium hydroxide, then with dilute hydrochloric acid, and again with dilute potassium hydroxide and then dried, first with saturated sodium chloride solution and then with anhydrous potassium carbonate. The solvent is evaporated from the dried solution and the residual oil is dissolved in benzene and chromatographed on basic alumina. The column is eluted with ethyl acetate-benzene. The solvent is evaporated from the eluate to leave oily crystals which are recrystallized from a mixture of ethyl acetate and hexane and then from ethyl acetate at −10° to give 4-(4-carbethoxy-1-piperazinyl)-3-phenylcinnoline melting at about 128–129° C. This compound has the following formula

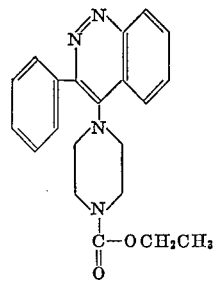

Example 8

A mixture of 2.4 parts of 4-chloro-3-phenylcinnoline and 2.7 parts of 1-phenylpiperazine in 10 parts of dimethyl sulfoxide is heated on a steam bath for 16 hours. The reaction mixture is then cooled and diluted with methylene chloride, and the organic solution is washed with dilute potassium hydroxide and dried. Evaporation of the volatile material under reduced pressure leaves a residual oil which is stirred with ether to cause it to solidify. The solid is separated and then crystallized from methanol to give 3-phenyl-4-(4-phenyl-1-piperazinyl)cinnoline melting at about 181–182° C.

Example 9

The procedure described in Example 4 is repeated using 6 parts of 4-chloro-3-phenylcinnoline, 7 parts of 1-benzylpiperazine, and 20 parts of dimethyl sulfoxide. The crude product obtained is crystallized from a mixture of ether and hexane and then from hexane to give 4-(4-benzyl-1-piperazinyl)-3-phenylcinnoline as yellow clusters melting at about 110–111° C. This compound has the following formula

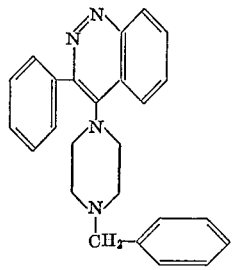

What is claimed is:
1. A compound of the formula

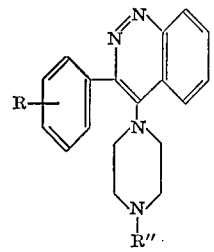

wherein R is selected from the group consisting of hydrogen, methyl, methoxy, and chlorine; and R″ is selected from the group consisting of hydrogen, lower alkanoyl, carbethoxy, lower alkyl, hydroxyethyl, phenyl and benzyl.
2. 3-phenyl-4-(1-piperazinyl)cinnoline.

3. 4-(4-methyl-1-piperazinyl)-3-phenylcinnoline.
4. 3-(4-chlorophenyl)-4-(4-methyl-1-piperazinyl)cinnoline.
5. 4-[4-(2-hydroxyethyl)-1-piperazinyl]-3-phenylcinnoline.
6. 4-(4-benzyl-1-piperazinyl)-3-phenylcinnoline.

No references cited.

ALEX MAZEL, *Primary Examiner.*

JAMES W. ADAMS, *Assistant Examiner.*